United States Patent [19]

Holley

[11] Patent Number: 5,728,361
[45] Date of Patent: Mar. 17, 1998

[54] METHOD FOR RECOVERING CARBON BLACK FROM COMPOSITES

[75] Inventor: Carl A. Holley, Riverview, Mich.

[73] Assignee: Ferro-Tech Tire Reclamation, Inc., Wyandotte, Mich.

[21] Appl. No.: 551,329

[22] Filed: Nov. 1, 1995

[51] Int. Cl.⁶ .................................................. C01D 3/00
[52] U.S. Cl. ................................ 423/449.6; 423/449.7
[58] Field of Search ........................ 423/449.6, 449.7, 423/488; 201/21, 36, 37; 588/213

[56] References Cited

U.S. PATENT DOCUMENTS

| | | | |
|---|---|---|---|
| 3,931,935 | 1/1976 | Holman | 241/24 |
| 4,221,608 | 9/1980 | Bekcman | 106/307 |
| 4,284,616 | 8/1981 | Solbakker et al. | 423/449.7 |
| 4,624,773 | 11/1986 | Wetlinger, Jr. et al. | 502/180 |
| 4,740,270 | 4/1988 | Roy | 201/35 |
| 4,839,151 | 6/1989 | Apffel | 423/449.7 |
| 5,005,194 | 4/1991 | Fritz et al. | 378/53 |
| 5,037,628 | 8/1991 | Fader | 423/461 |
| 5,070,109 | 12/1991 | Ulick et al. | 521/41 |
| 5,087,436 | 2/1992 | Roy | 423/461 |
| 5,095,040 | 3/1992 | Ledford | 521/41 |
| 5,158,983 | 10/1992 | Stapp | 521/41 |
| 5,225,044 | 7/1993 | Breu | 201/26 |
| 5,229,099 | 7/1993 | Roy | 423/461 |

OTHER PUBLICATIONS

J. Dodds, W.F. Domenico, D.R. Evans, L.W. Fish, P.L. Lassahn, and W.J. Toth, "Scrap Tires: A Resource and Technology Evaluation of Tire Pyrolysis and Other Selected Alternate Technologies", U.D. Department of Energy, Nov. 1983.

*Primary Examiner*—Michael Lewis
*Assistant Examiner*—Stuart L. Hendrickson
*Attorney, Agent, or Firm*—Barnes, Kisselle, Raisch, Chaote, Whittemore & Hulbert, PC

[57] ABSTRACT

The invention provides a method and system for continuously recovering carbon black from a plurality of composites where each one of the composites comprises carbon black and polymers. The basic method of the invention comprises a heating step which is conducted in a reactor. In the method, it is necessary to prepare a series of mixtures of the composites, with each one of the series comprising a distribution of carbon black properties substantially similar to the other mixtures of the series. The composites may be fragmentized or comminuted into smaller pieces more suitable for pyrolysis and decomposition reactions in the reactor. In the reactor, the fragmentized mixtures are heated to a temperature sufficient to crack the polymers and to form a vaporizable constituent. The vaporizable constituents are removed from the reactor at first and second outlet ends whereby the amount of time the vaporized constituents are in the reactor is reduced. That is, their residence time is reduced by the method of the invention which includes removal at two ends. The vaporized constituents are then cooled to form condensate fraction and a gaseous fraction. The gaseous fraction is then used for reinjection into the reactor chamber.

38 Claims, 4 Drawing Sheets

METHOD FOR RECOVERING CARBON BLACK FROM COMPOSITES

FIELD OF THE INVENTION

The present invention relates to improvements in the field of reclaiming useful materials from discarded waste materials. More specifically, the present invention relates to reclaiming of carbon black from discarded composites comprising carbon black.

BACKGROUND OF THE INVENTION

A major environmental problem is posed by the disposal of automobile and other vehicle tires and similar composites comprising carbon black and polymers. According to The Scrap Tire Management Council in Chapter 18 of M<sup>c</sup>Graw Hill's *Handbook of Solid Waste*, in 1990 there were some 278 million car and truck tires discarded in the United States. The scrap tire generation rate has increased from 1.04 per capita in 1984 to 1.25 in 1990. Only 34 percent (%) of these tires were reused, recycled, or recovered after several years of intensive effort to improve scrap tire recycling. In a DOE sponsored report published in November 1983 and entitled "Scrap Tires: A Resource and Technology Evaluation of Tire Pyrolysis and Other Selected Alternate Technologies" (DE 84-003924) it is described that the 70 percent of tires which are dumped in land-fills or junk yards pose health, safety, and environmental problems. According to the DOE report, each single tire contains about 300,000 BTU of energy. When whole tires are buried in land-fills, they eventually float to the surface. This represents a significant hazard if they are ignited by lightening or vandals. In February 1990, such a fire occurred in Hageville, Ontario, Canada in a tire dump containing 12 million to 14 million tires. The fire generated heat of over 1100° C. (2,000° F.) and dispersed toxic fumes and chemicals. Some of the chemicals, in liquid form, seep into the ground contaminating water supplies and posing a fire hazard. Accordingly, the burning of tires has long been in disfavor as a method of disposal and since tires are also undesirable for disposal in land-fills because they do not readily deteriorate, there is a need for methods to recycle tires and reclaim usable products from the tires and similar composites containing carbon black. U.S. Pat. No. 5,229,099 issued Jul. 20, 1993 describes a method for decomposing scrap tires under extreme vacuum. This method which requires high vacuum on the order of 0.3 KPA absolute pressure is expensive. U.S. Pat. Nos. 5,087,436 and 4,740,274 describe similar decomposition processes under high vacuum.

These methods that require decomposition in a vacuum are very expensive, and the carbon product produced by these processes does not appear to be of commercial quality.

Accordingly, what is needed is a new method and system which produces commercially usable carbon black product and which is efficient, cost effective, and readily adaptable for commercial production.

SUMMARY OF THE INVENTION

The invention provides a method and system for continuously recovering carbon black from a plurality of composites where each one of the composites comprises carbon black and polymers. The basic method of the invention comprises a heating step which is conducted in a reactor. The reactor comprises a chamber having a first end, a second end, a longitudinal axis between the ends, and means for transporting the material from the first end to the second end. The reactor also comprises means for removing vaporized constituents from the chamber through both of the ends of the reactor. In the basic method of the invention, it is necessary to prepare a series of mixtures of the composites, with each one of the series comprising a distribution of carbon black properties substantially similar to the other mixtures of the series. This is done by selecting composites having a variety of carbon black properties and combining the selected composites in a defined proportion. This results in formation of a blend of composites to be fed to the reactor in a continuous series; where the distribution of carbon black properties within the blends is substantially similar so that the product outcome of the process is also substantially similar in selected characteristics as further described hereinbelow. The composites may be fragmentized or comminuted into smaller pieces more suitable for pyrolysis and decomposition reactions in the reactor. The invention can be practiced with material as large as whole passenger tires, or smaller pieces which are more easily introduced into and give better heat transfer performance in the processing. It is preferred that the composites be fragmentized or comminuted to pieces having a maximum dimension less than about one half a foot. It is desirable that the pieces have a maximum dimension less than about 5 centimeters (cm)×5 cm (2 inches (")×2") and it is most preferred that the dimension of the pieces be 5 cm×2.5 cm (2"×1") to 2.5 cm to 1.3 cm (1"×½"). The fragmentized (comminuted) pieces must be introduced into the reactor while carefully controlling the amount of air that enters the reactor. The introduction can be made by a variety of air lock chamber arrangements consisting of multiple valve. The preferred method consistent with the practice of this technology is a series of three valves which allow both continuous feed of material to a receiving bin above the valves and also mitigates the introduction of oxygen containing air that is naturally contained in the uneven geometry of the fragmentized (comminuted) pieces. These valves cycle in a manner such that at least one valve is closed at all times. As part of the cycle, the valve chambers are alternately pressured and evacuated with air or recycle gas to virtually eliminate air introduction into the reactor and emission of recycle gas to the atmosphere. The fragmentized (comminuted) pieces are heated in the reactor by conveying the mixtures in a continuous series through the chamber of the reactor.

The fragmentized (comminuted) mixtures are heated to a first temperature sufficient to crack the polymers of the composite, and then to a second temperature greater than the first temperature. The second temperature is sufficient to vaporize any vaporizable constituents formed from the cracked polymer. Both the first and second temperatures are each less than the combustion temperature of the carbon black in order to prevent destruction of its essential characteristics. The vaporizable constituents formed from the cracked polymer are continuously removed from the reactor chamber by flowing a first portion of such vaporized constituents in a direction toward the first end of the reactor chamber and through an outlet at the first end and flowing a second portion of the vaporized constituents in a direction toward the second end of the reactor chamber and through an outlet at the second end. Since the vaporized constituents are removed from the reactor chamber at both of its ends, the amount of time the vaporized constituents are in the reactor is reduced compared to the amount of time such would have remained in the reactor had removal occurred through just one end. Accordingly, the time interval during which a representative element of material actually remains in the reactor (residence time) is reduced by the method of the invention which includes removal at two ends. A non-vaporizable residue is continuously conveyed from the reactor chamber. This non-vaporizable residue is what remains after heating to the respective first and second temperatures. The non-vaporizable residue comprises a carbonaceous material and a non-carbonaceous material. The carbonaceous material is separated from non-carbonaceous material of the residue. Then, the carbonaceous material is comminuted to form particles of carbon black having a particle size less than about 5 microns. Next, the comminuted carbon particles are combined with a binder dispersed with a liquid and pelletized in order to improve physical handling of the particles. The pellets are dried to remove at least a portion of, and preferably essentially all of, the liquid dispersant.

It is preferred that after the step of heating the comminuted mixtures and before the step of separating the carbonaceous material from the non-carbonaceous material that there be the step of cooling the non-vaporizable residue from the chamber and then roll crushing it followed by the step of separating the non-carbonaceous material from the carbonaceous material. It is preferred that the residue is cooled to a third temperature which is less than the first temperature of the reactor. It is preferred that the step of cooling the residue occur before the step of separation of the carbonaceous material from the non-carbonaceous material. It is preferred that such cooling step be in an environment which is inert with respect to carbon black. It is preferred that the cooling of the residue occur by contacting the residue with a gaseous fraction of the vaporized constituent obtained by cooling the vaporized constituent and separating a condensate fraction from the vaporized constituent to produce the gaseous fraction. It is preferred that the residue be cooled by flowing the gaseous fraction over a moving bed of the residue in a counterflow arrangement whereby the gaseous fraction is heated. The gaseous fraction so heated is later used for injection into the thermal chamber adjacent the second end of the reactor chamber as described more particularly hereinbelow. It is preferred that the residue be cooled to a temperature of below about 150° C. (300° F.) and desirably cooled to a temperature in a range of about 65° C. (150° F.) to 150° C. (300° F.). After the residue is cooled and separated to separate out a carbonaceous material, such carbonaceous material is then comminuted to form particles of carbon black which are then pelletized. In order to enhance formation of pellets of relatively consistent dimension, the flow of carbon black particles having the preferred size of less than 5 microns is regulated as such particles are fed into a pelletizer. Such regulation is by nuclear means which monitors the mass flow of the carbon black by directing gamma radiation toward a flowing mass of the carbon black, detecting attenuation of the radiation by the carbon black, and adjusting the mass flow to a desired rate by monitoring a change in attenuation corresponding to the change in the mass flow. In the pelletizer the carbon particles are combined with the binder whereby pellets are formed. Next, the pellets are dried by flowing a heated gas stream upward and through the pellets and in this same step the flowing gas stream separates any particles finer than about 150 microns (100 mesh) from the pellets by entraining such finer particles in the flowing gas stream. It is preferred that the step of drying the pellets be conducted using a heated gas which is a mixture of the combustion products of the gaseous fraction mentioned hereinabove obtained by separating the gaseous fraction from a condensate fraction of the vaporized constituents from the reactor and burning it with combustion air. It is preferred that the combustion products be supplied to the dryer at a temperature between 90° C. (200° F.) and 300° C. (575° F.). It is preferred that after the drying step the pellets be cooled by flowing an ambient temperature air stream upward and through the pellets and again separating particles finer than about 150 microns (100 mesh) from the pellets by entraining such finer particles in the flowing air stream.

One important feature of the invention is the classification of the composite materials and the development of relatively consistent blends to be processed in the reactor chamber. The method of classification may vary depending on the feed material and the desired outcome. In one embodiment the composite materials are classified by determining the primary aggregate dimensions of the carbon particles of each of the composites and preparing a series of mixtures each having similar distribution of primary aggregate dimensions as measured by electron microscope image analysis (ASTM D3849). The average particle size of any one of the mixtures in a series should vary by no more than 10 percent compared to the average particle size of any other mixture in the series.

In another embodiment classification is by determining the surface area by measuring the capillary action such as CTAB adsorption (ASTM D3765) of the carbon particles of each of the composites and preparing the mixtures each having similar CTAB adsorption. Other capillary action methods may be useful such as DBP (ASTM D3493). These methods of are thought to be less desirable but are usable for forming the series of carbon particle mixtures having similar characteristics throughout the series.

In another embodiment classification is by determining the particle size of the carbon particles of each of the composites and preparing the mixtures each having similar distribution of particle size. In one embodiment particle size is calculated from Tint and DBP measurements. Other methods of classification are by compressed DBP and Tint. These methods of classification are thought to be less desirable but are usable for forming the series of carbon particle mixtures having similar characteristics throughout the series.

Another important feature of the invention is the treatment of the vaporized constituents by cooling them and separating a condensate fraction of such constituents from a gaseous fraction. It is preferred that cooling of the vaporized constituents be at a temperature sufficient to provide the condensate fraction with a flash point (ASTM D93) greater than 38° C. (100° F.) to facilitate storage and transportation. This fraction will preferably have mostly components of C-4 and heavier. It is also preferred to produce a gas stream with fuel value matched to the heating requirements of the rotary thermal process (D, FIG. 1) and the fluidized bed dryer (J, FIG. 1) It is preferred that the cooling of the vaporized constituents be conducted by contacting the vaporized constituents with a stream of oil at an initial temperature between about 20° C. (68° F.) and 75° C. (167° F.). It is desired to use an oil at an initial temperature between about 30° C. (85° F.) and 65° C. (150° F.). It is most preferred to use an oil at an initial temperature between 35° C. (95° F.) and 50° C. (122° F.). The method of the invention is flexible, accordingly, the temperature of the cooling oil introduced to the hot gas/vapor stream may be varied to change the proportion of the gas fraction relative to the condensate fraction. Where the temperature of the cooling oil is relatively cooler, the proportion of the condensate fraction will increase compared to the case where the cooling oil temperature is relatively warmer where the proportion of the gas fraction will increase and the condensate fraction will decrease.

The gas fraction so obtained by separation is advantageously used as an injection stream supplied into the reaction chamber adjacent the second end of the reaction chamber. This injected gas stream has a hydrogen gas content, based on volume percent, which is greater than the volume percent of hydrogen gas in the vaporized constituents evolved in the reactor. The relatively high hydrogen content of the injected stream combines with the cracked polymers in the reactor to cause at least partial saturation of at least a portion of the cracked polymers. This injected flowing stream entrains the vaporized constituents for removal out of the reactor by the momentum of the injected stream. It is preferred that the injected stream has a rate, based on volume per unit of time, which is in a range of 0.67 to 2.5 times the rate at which the vaporized constituents are produced in the reactor chamber. The injected gas stream, also referred to as recycled gas, provides several important advantages. It sweeps the vaporized constituents out of the heating drum and prevents their condensation. It reduces the partial pressure of vaporized constituents to facilitate further evolution of such constituents. It provides a higher hydrogen gas concentration to promote hydrogenation and it leads to partial saturation of hydrocarbon compounds. It reduces the residence time of the evolved vaporizable constituents in order to reduce the tendency for such constituents to form polymers and cyclic compounds.

Other features of the process include control of the temperature and level of oxygen in the reactor chamber. The composite materials enter the reactor at a first entrance end and are heated to a first temperature which is at least about 275° C. (525° F.), desirably 360° C. (680° F.), and preferably 385° C. (725° F.). The composite is then heated to a second temperature which is greater than the first temperature. It is preferred that the second temperature be between about 400° C. (750° F.) and 650° C. (1200° F.), desirably between about 450° C. (840° F.), and 600° C. (1110° F.) and more preferably between about 520° C. (970° F.) and 540° C. (1000° F.).

The above composite heating methods produce the most desired products of this invention. Other heating methods will produce products of a different character. For example, the sulfur can be influenced to remain predominantly with the non-volatile solids by employing lower temperatures. The simultaneous effects are to require lower feed rates to achieve the same level of de-volatilization, produce a carbon black with higher sulfur content and lower surface area, and correspondingly increase the sulfur content in the char. It may be desirable to practice this method in cases where low sulfur fuel is more valuable than higher reinforcing carbon. Similarly, various combinations of higher temperatures may be optimal for other product objectives.

In the method of the invention, while the composites are heated in the reactor chamber the presence of oxygen in the reactor chamber is controlled to within a desired range or variation. The presence of oxygen in the reactor chamber will have a direct effect on the characteristics of the carbon black obtained from the process. Accordingly, it is desirable to monitor and control the volumetric fraction of oxygen in the chamber to within consistent levels in order to provide consistent carbon black product. It is desirable to control the volumetric fraction of oxygen in the reactor chamber to a maximum value no greater than about 1.5 times the amount of a minimum value of the oxygen. It is preferred that there be some minimum value of oxygen in the reactor chamber where such minimum volumetric fraction of oxygen is least ½ of 1 percent by volume of the total volume of the vaporized constituents formed and evolved in the chamber.

In addition, it is preferred that the heating rate in the reactor chamber be no more than about 20° C. (36° F.) per minute. It is preferred that the composite material be heated in the reactor for a time of at least about 20 minutes and preferably for a time between 20 minutes and 40 minutes. It is preferred that the injected hydrogen rich stream supplied to the reactor have a flow rate greater than the rate at which the vaporizable constituents are evolved in the reactor.

The method of the invention provides controlled conditions for pyrolysis, cracking, and hydrogenation reactions for separation of polymeric materials from the solid residue comprising carbon black. Under the controlled conditions of the invention, the separation is conducted without destroying the essential desired characteristics of the carbon black obtained by the method and apparatus of the invention.

It is an object of the invention to provide a method for reclaiming carbon black while maintaining as closely as possible its chemical and physical properties similar to those of conventional carbon blacks having commercial utility. Another object of the invention is to provide useful gaseous and liquid products and to recycle such products into the process as a source of energy and to control the atmosphere under which decomposition and separation takes place promoting reclamation of commercially usable carbon black.

Another object of the invention is to provide a method and apparatus for continuous recovery of carbon back from composite waste materials.

The carbon black produced by the process of the invention is a reclaimed carbon black with chemical and physical properties similar to conventional carbon blacks and is consistent with properties of conventional commercially usable carbon blacks. This is achieved without the necessity of operating under a vacuum or at very high pressures. In addition, the method of the invention provides useful, gaseous, and liquid product streams which are recycled to provide energy for the process and to control the atmosphere under which decomposition takes place so as to generate commercially usable carbon black as well as useful gaseous and liquid products. Advantageously, the process of the invention is a continuous process rather than a batch process.

These and other objects, features, and advantages of the invention will become apparent from the following description of the preferred embodiments, claims, and accompanying drawings.

DETAILED DESCRIPTION OF THE PREFERRED EMBODIMENTS

Before describing the invention, it is useful to understand the problems associated with present disposal methods for composites containing carbon black, such as tires. Such composites comprise vulcanized rubber, rubberized fabric with reinforcing textile cords, steel or fabric belts, and steel wire reinforcing beads according to the above referenced DOE report. The most commonly used tire rubber is styrene-butadiene-copolymer (SBR) containing about 25 weight percent styrene. Other rubbers used in tire manufacture include natural rubber (cis-polyisoprene), synthetic cis-polyisoprene, and cis-polycarbon. The carbon black is used to strengthen the rubber and aid abrasion resistance. Extender oils which are a mixture of aromatic hydrocarbons, serve to soften the rubber and improve workability. Sulphur is used to cross-link the polymer chains within the rubber and also hardens and prevents excessive deformation at elevated temperatures. The accelerator is typically an organo-sulphur compound which acts as a catalyst for the vulcanization process. The zinc oxide and stearic acid also act to control the vulcanization process and in addition enhance the physical properties of the rubber. Tires in general contain approximately one part carbon black for every two parts of rubber or elastomer. Elastomer is defined as a natural or synthetic polymer that has, or can be treated to have, elasticity. Carbon black is defined as finely divided carbon produced by pyrolysis of hydrocarbons. Other definitions are provided following. The combination of carbon black and elastomer constitutes over 90 percent by weight of the tire compound with various additives comprising the balance. In U.S. Pat. No. 5,229,099, the vacuum decomposition method is concerned with obtaining a commercially valuable aromatic, cyclic compound and is not concerned with the quality of the solid residue formed during the decomposition of the tires. This is evident from U.S. Pat. No. 5,229,099 at column 7 wherein it is described that there is a significant difference between the tire derived carbon black and commercial carbon blacks. The physical/chemical properties of the carbon black produced by the method of U.S. Pat. No. 5,229,099 are outside the specification of most commercial carbon blacks, and there is no indication of effective performance in rubber therefore the carbon black is not commercially usable. Another method as described in U.S. Pat. No. 5,158,983 is also concerned with production of a usable liquid chemical from the decomposition of tires to form an oil feed stock by a hydrogenation method which requires pressures on the order of up to 5,000 Psig maintained during decomposition. This is to promote hydrogenation of the decomposition product in order to obtain a particular liquid chemical product. The composition of the carbon black from the process is not of a concern, therefore, the commercial utility of the carbon black produced by U.S. Pat. Nos. 5,158,983, 5,229,099, 5,087,436, and 4,740,274 is poor. Each of the foregoing four U.S. Patents is incorporated by reference in its entirety. One of the difficulties of the present methods, as described in the aforementioned patents, is that the solid carbon product obtained is only suitable for use as a substitute for coal, at best, and has no other commercial applicability. Accordingly, in order to produce additional carbon black for future tire production it is necessary to invest thermal energy necessary to obtain carbon black from pyrolysis of a hydrocarbon. In conventional carbon black production, all of the raw material energy plus additional utilities are consumed in the carbon black production. It would be much more energy efficient to be able to recover a carbon black in the form in which it retains as many of its initial characteristics as possible in order to use it directly as a carbon black rubber ingredient.

In order to resolve the unmet needs of present disposal systems, the invention provides a means to recover commercial grade carbon black, that is, carbon black suitable for use in forming a wide variety of commercial rubber, plastic, and pigment products. Such carbon black is referred to as rubber grade carbon black, useful for reinforcing rubber compound. Rubber compound is the unvulcanized rubbers blended with carbon black, extender oils, and other additives for use in tires or other commercial products. The method of the invention removes non-carbon black components from scrap tires and other composites with minimum alteration of the chemical and physical properties of the carbon black contained in such solid waste composites.

In the description of the invention, the following terms are used:

1. Cyclic—carbon containing ringed compounds.
2. Carbon Black—finely divided carbon produced by pyrolysis of hydrocarbons.
3. Char—the solid residue remaining after pyrolysis of a tire and after removal of steel and fiberglass, if present.
4. Batch—a process in which the entire charge of material being processed enters the process at the beginning of the operation.
5. Continuous Process—a process in which material enters and leaves continuously with time.
6. Cracking—a process whereby one material is reacted to produce two or more materials of smaller molecular weight.
7. Elastomer—a polymer that has, or can be treated to have, elasticity.
8. Fluidized Bed—a gas-solids containing device in which the gas flows upward through a loosely packed bed of granular solids.
9. Pyrolysis—the process of breaking organic chemical bonds by heating—also known as destructive distillation, thermal depolymerization, thermal cracking, thermolytic distillation, carbonization, and coking.
10. Vaporizable Constituent—volatile matter evolved by heating a composite comprising carbon black and polymer.
11. Condensate Fraction—the fraction of the vaporizable constituent that condenses, generally, higher hydrocarbons of C-4 or greater.
12. Gaseous Fraction—the fraction of the vaporizable constituent remaining after the fraction of the condensate fraction is separated out.
13. Residence Time—the average time interval during which a representative element of material actually remains in the reactor.
14. Kiln, (Rotary Kiln)—an enclosed place, (cylindrical vessel heated directly or indirectly) which may be lined with refractory material, (usually inclined at a slight angle and rotated at a slow speed).
15. Rubber Compound—un-vulcanized rubber blended with carbon black, extender oils, and other additives for use in tires or other products.
16. SBR—styrene butadiene rubber.
17. Scrap Tire—a worn tire for which no economic end use has been found.
18. Tread—the portion of a tire that makes contact with the road surface.
19. Vulcanization—the process whereby rubber attains increased hardness, strength, and elasticity through the action of sulfur in the presence of heat.
20. Polymer—a chemical compound or mixture of compounds formed by polymerization and consisting essentially of repeating structural chains.
21. Composite—mixture of carbon black and natural and/or synthetic polymers such as elastomers and rubber; includes tires and other composites, such as treads, carcass, roofing, and the like.

22. Carcass—the body of the tire including the bead and rubber stocks inside the tread but excluding the tread.

Figure 1:
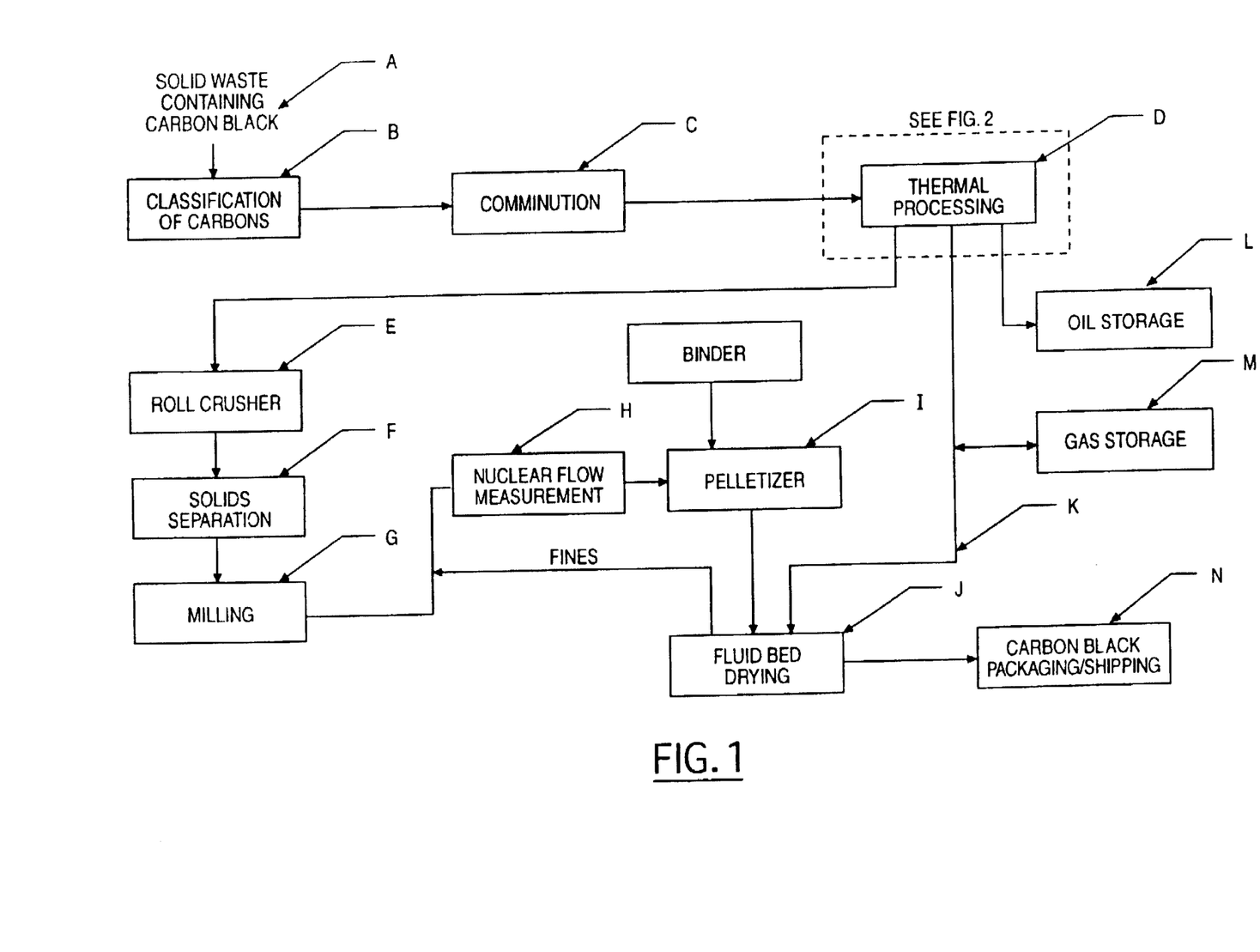
FIG. 1 is a block flow diagram illustrating the processing steps and means employed for carrying out the various embodiments of the invention.

FIG. 1 illustrates a continuous process and apparatus for processing solid waste composite containing carbon black material so as to continuously recover the carbon black, and to produce useful products from organic components of the composite, according to the invention.

General System

Figure 2:
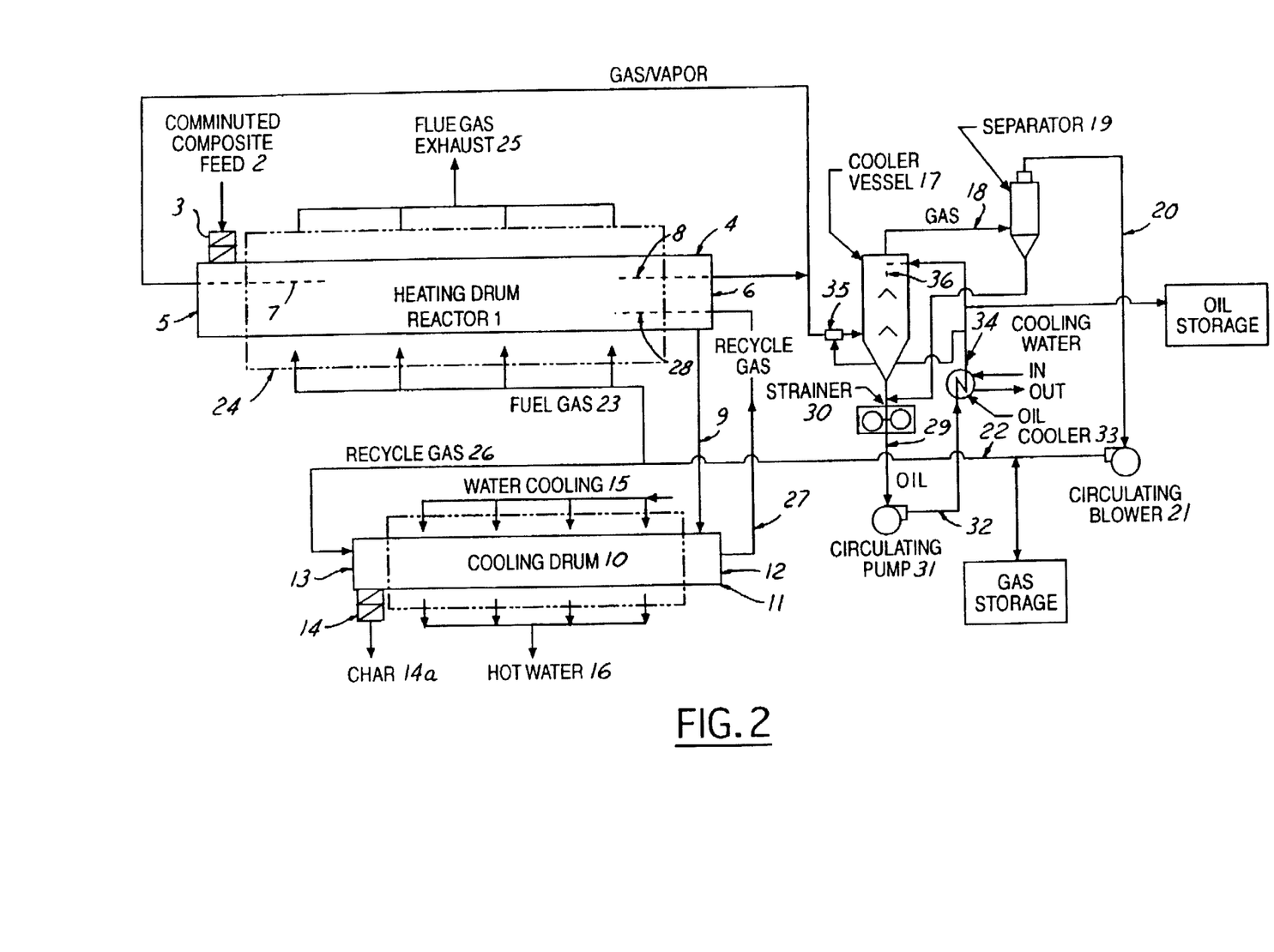
FIG. 2 is a schematic detail of the thermal processing block of FIG. 1.
Figure 3A:
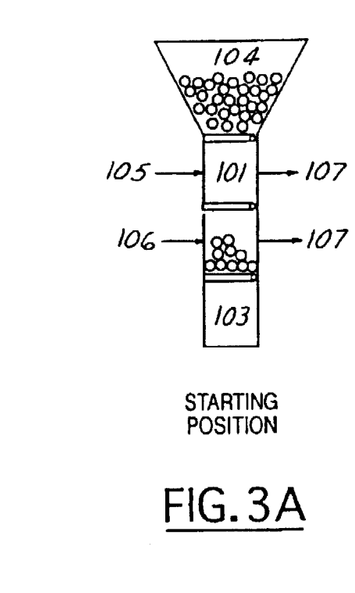
FIG. 3 is a schematic drawing of the sequential positions of the air exclusion device.
Figures 3B, 3C:
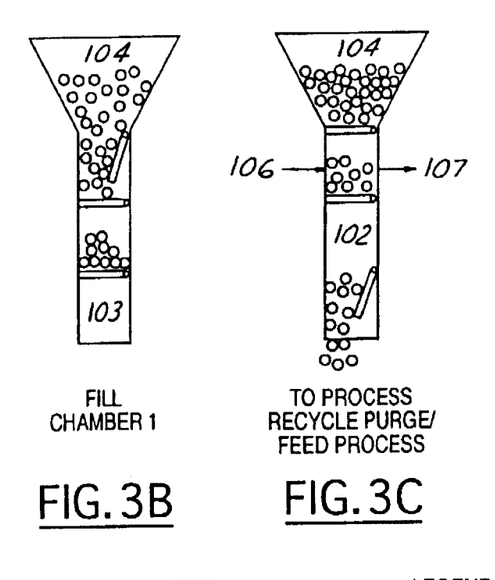
Figures 3D, 3E:
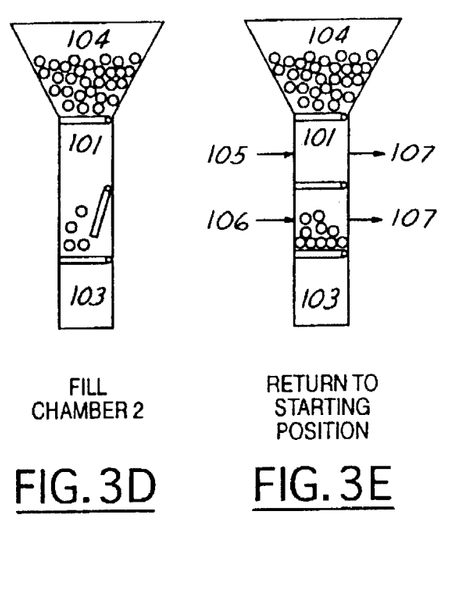
Figure 3F:
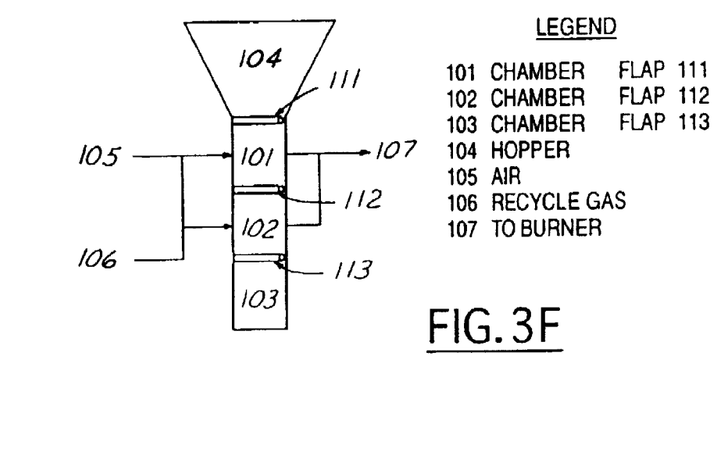

Referring to FIG. 1, the waste material A is classified B according to the physical and chemical characteristics of the carbon black contained in each composite. The composite material is comminuted C to a size with largest dimension less than 15 cm (6"), and preferably 2.5 cm×2.5 cm (1"1"). Any conventional means of comminution may be employed. One such means is described in U.S. Pat. No. 3,931,935 incorporated herein by reference in its entirety. It is thermally processed at elevated temperature D to produce a solid residue, char contaminated with steel and fiber, and a gas/vapor product. The gas/vapor product is also referred to as a vaporized product. Thermal processing is illustrated in FIG. 2. The solid residue is crushed in a roll crusher E to loosen char from steel and fiber, and to reduce the size of the char to 0.2 cm to 0.5 cm (0.1" to 0.2") as it passes between the two rolls. The pieces of char are very brittle and therefore shatter into pieces that are much smaller than the spacing between the two rolls. The steel cords are removed by magnetic and screen methods F, that is by passing the material over a magnetic drum separator, the magnetic steel is separated from the non-magnetic char and fiber. The separated steel may be sold to a steel company and recycled into new steel. The char with the fiber cords are placed on a vibrating screen which has a solid plate for the first one-quarter of the deck and a wire mesh for the remainder of the deck. The fiber cords lay flat on the plate and the wire mesh deck so they do not pass through the opening in the wire mesh while the small pieces of char do pass through the opening in the wire mesh. The fiber is generally a negligible weight fraction of the feed. The solid residue (char) is milled to a particle size of less than 5 microns in a jet mill G to form carbon black. Compressed air at pressures up to 120 Psig is utilized as the grinding fluid. The size of the final particles of carbon black is controlled by adjusting the air pressure and quantity. Producing a char that contains less than 3% (by weight) volatiles is important to reduce the amount of compressed air required for grinding. The milled char, carbon black, is pelletized to facilitate handling and to prevent degradation of carbon black properties. Accurate flow measurement of the very finely divided carbon black is provided by a nuclear flow measuring device H. The pelletizer I receives the carbon black and combines it with a binder at ambient temperature to produce a moist 10×80 mesh (1,680×177 microns) pellets. The binder is water soluble and is selected from the group including lignosulfonate, molasses, waste from sugar manufacture, waste from beer manufacture, or other sugar containing products. The preferred pellet hardness is achieved by regulating the concentration of the binder. The moist pellets are dried by means of a fluid bed dryer J which is heated by fuel K obtained from the thermal process.

The vaporized product from the thermal process D is separated into a gas fraction and a liquid condensate fraction. The gas fraction is generally C-4 and lighter hydrocarbons. The liquid condensate fraction is also referred to as oil product.

The oil product from the recovery process is typically stored L for sale. Optionally, the oil may be used for the heating requirements of the thermal process D. The gas fraction from the gas/vapor separation process is stored M by conventional means for use in the thermal process D if required. The gas may also be sold as an industrial fuel. The carbon black pellets from the process may be packaged N for sale in bags or bulk.

Thermal Reactor Drum

Referring to FIG. 2, the thermal processing system of D in FIG. 1 includes a heating assembly or reactor generally shown at 1. The comminuted composite of C in FIG. 1, at 2 in FIG. 2 is conveyed to air excluding valve device 3. Referring to FIG. 3, the air exclusion device consists of preferably three valve chambers 101, 102, and 103, a feed bin 104 and the corresponding valve flappers 111, 112, and 113, and the conduits 105, 106, and 107. The valve bodies 111, 112, and 113 are assembled in direct vertical contact with sealing means between the connections of each valve.

The valve body 101 is connected to air purge line 105 to fill the chamber 101 during part of the valve cycle. The valve bodies 101 and 102 are connected to a recycle gas purge line 106. Both valve bodies 101 and 102 are simultaneously connected to a vent line 107 which evacuates the chambers, preferably to the combustion chamber 24 of FIG. 1. To introduce feed material to the reactor, the purge lines, vent lines, and valve flaps are opened and closed in a specific sequence. The preferred sequence is shown in Detail 3a through 3e. In Detail 3a, all flap valves are closed, air from conduit 105 is purging chamber 112 of recycle gas while conduit 106 is purging chamber 102 of air. In Detail 3b, all purge lines are closed and flap 101 opens to admit composite into chamber 102. In Detail 3c, flap 113, opens to admit composite to the process while recycle gas from conduit 105, purges chamber 101, of air introduced to the chamber with composite in step 3b. In Detail 3d, flap 112 opens to admit composite into chamber 102. Detail 3e is the same as Detail 3a with air and recycle purge of the chambers 101 and 102 respectively. The cycle of the valves is preferably conducted over a time frame of approximately 10 seconds. The purge gas volume of each chamber is preferably 3 times the chamber volume for each step of the cycle.

Figure 4:
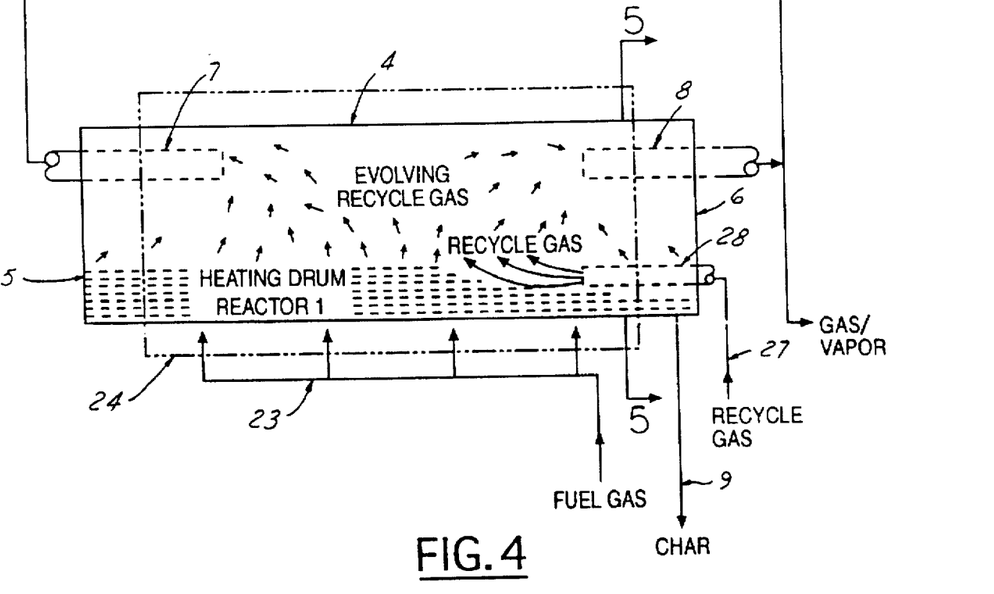
FIG. 4 is a schematic detail of the gas/vapor flows of the Thermal Processing step of FIG. 1.
Figure 5:
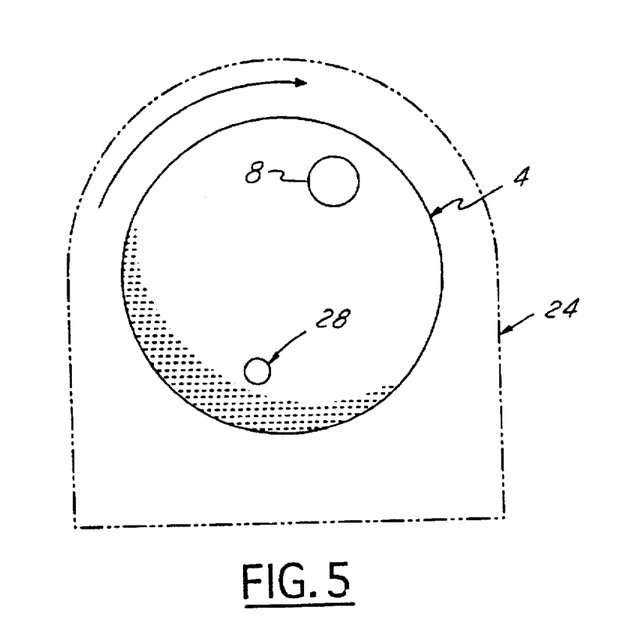
FIG. 5 is a section view of FIG. 4.

Referring to FIG. 2, the air excluding device 3 delivers the comminuted composite to reactor 1 which comprises a chamber, preferably in the shape of a drum 4. The composite material is delivered to the horizontal, rotating, externally heated drum 4. The drum has an entrance end, first end, 5 which is elevated approximately 3 degrees above the exit end, second end, 6. The entrance and exit ends include respective means for receiving and discharging the material. The incline of the drum and the drum rotation propel the material through the drum. As the material passes from the entrance 5 to the exit 6 of the drum 4, the heat from the drum 4 causes elevation of the temperature of the material and it is pyrolyzed as it traverses the drum. Pyrolysis of the composite results in formation of a carbonaceous residue and vaporized constituents. Referring to FIG. 4., the vapor evolves from the processing material which generally covers the 10% drum volume at the bottom and toward the upward rotating side of the drum. The gas/vapor is withdrawn from the drum through conduits 7 and 8 which extend from outside of drum 4 through the ends 5 and 6. The distance conduits 7 and 8 extend into drum 4 is related to the size of drum 4. The distance from drum end 5 to the end of conduit 7, internal to drum 4, is between 10% and 40% of the length of drum 4 from end 5 to end 6. The distance from drum end 6 to the end of conduit 8, internal to drum 4, is between 10% and 40% of the length of drum 4 from end 5 to end 6. The conduits 7 and 8 are positioned parallel to the axis and above the horizontal center line of drum 4. Referring to FIG. 5., conduit 7 and 8 are located toward the top and downward rotating side of drum 4. Conduit 8 (and 7 not shown) are positioned between the drum 4 vertical centerline and the downward rotating side of drum 4. Conduit 28 is positioned between the drum 4 center line and the upward rotating side of drum 4. The drum rotation is indicated clockwise as viewed from end 6. However, the rotation may be in either direction while maintaining the respective positions of conduits 7, 8, and 28.

The essential features of the heating drum assembly are the drum, drive machinery, rolling components, riding rings, trunion rolls, and thrust rolls, breaching seals, and heating unit. The drum is constructed of an alloy capable of withstanding the operating temperature for a period of about 100,000 hours. Stainless steel in a variety of alloys are common construction material choices. The drum length is typically 10 times the diameter. Internal flights may be used to affect the rate and uniformity of heating the material. The drive machinery consists of a cut tooth ring by which the cylinder is rotated. A gear reducer converts motor speed to the desired cylinder speed. A chain drive is common for high temperatures. The speed is controlled by a pulse width modulated electronic variable frequency speed controller that is infinitely adjustable over the entire speed range of the drum. The rolling components consist of riding rings that are secured to the exterior of the cylinder, trunion rolls on which the cylinder riding rings rotate, and thrust rolls which are placed on either side of one riding ring to keep the cylinder in its proper longitudinal position. Riding rings are locomotive class "C" tires of solid rectangular section 0.7 to 0.8 carbon and located approximately 20% of the drum length from each end of the drum. Trunion rolls are high carbon steel with heat treated tread surfaces and live shaft mountings in pillow blocks with anti-friction roller bearings. The thrust rolls have heat treated surfaces and turn on vertical, stationary, shafts mounted in journals welded to adjustable steel brackets. The inlet has sequencing flap valves with purge and evacuation to introduce material to the breaching while excluding air and preventing the escape of gas/vapor. Referring to FIG. 2, the breaching at the entrance end 5 and exit end 6 are stationary circular heads that prevent escape of material from inside the drum and leakage of air into the drum. The entrance breaching is fitted with a feed chute; the bottom of the exit breaching has a discharge hopper. The breechings have a spring tensioned seal that closes the space between the rotating cylinder and the stationary breaching. The heating unit 24 is an insulated furnace surrounding the drum between the entrance end 5 and exit end 6 and preferably heated by a series of tangentially fired gas burners so arranged as to provide a close approximation of the heat demand. The burners are located on one side of the furnace casing and arranged for zonal control. The heating unit may include heat recovery means on the discharge of the furnace flue gas at 25.

Cooling Drum

Referring to FIG. 2, the solid residue discharged from the drum 4 passes through conduit 9 to the solids cooling assembly generally shown at 10. The cooling assembly contains a horizontal, rotating, cooled, drum 11 similar to the drum 4 of reactor 1. The solids, consisting of char, steel, and fiber at high temperature, preferably travel by gravity through conduit 9 to the cooling drum 11 and enter the cooling drum at entrance end 12. The solids are cooled by the colder inner surface of the drum and exit the drum at end 13 through air exclusion means 14. The cooling for drum 11 is provided by a cooling fluid typically applied directly to the drum's outer surface. Desirably, water is sprayed on the drum by nozzles 15 and it is at least partially vaporized to provide cooling for the drum. Un-vaporized cooling water exits the bottom of the cooling assembly 10 at manifold 16.

The cooling drum is similar in construction detail to the heating drum. The furnace is replaced by a chamber for direct water spray cooling of the outside of the drum.

Cooler and Separator

Referring to FIG. 2, the vaporized constituents exiting the reactor 1 through conduits 7 and 8 are conducted to the gas/vapor cooler 17. The hot stream is quenched by a spray nozzle at 35 injecting cooled condensate fraction into the gas/vapor stream ahead of the entrance to cooler vessel 17. The gas and oil disengage in the bottom open area of the cooling vessel. The rising gas is contacted with additional cooled condensate introduced by nozzle 36 which sprays condensate downward through the gas fraction further removing high boiling constituents of the gas. The gas is conducted through exit line 18 to separator 19. Separator 19 is desirably one of several types, cyclonic, coalescing filter type, or a combination of cyclonic and coalescing filter. The oil from the separator is joined with the liquid condensate collected from the gas/vapor stream. The gas from the separator is directed through conduit 20 to a circulating blower or compressor means 21 for increasing the pressure of the gas for combustion, storage, or sale and transport. A portion of the gas from the blower 21 is conducted through conduit 22 to burners 23 in the furnace housing 24 of reactor 1 for heating the drum 4 to a predetermined operating temperature.

The oil recovered from the gas/vapor cooler vessel 17 and the circulating oil in conduit 34 are drawn from the bottom of the cooler vessel 17 through conduit 29 and through an oil strainer 30. The oil strainer 30 removes particulates that may carry over with the evolving gas/vapor and recycle gas from the heating drum 4 with a 10 micron dual basket strainer. Removing solid particulates at this point mitigates particulate introduction to the circulating pump 31, oil cooler 33, and the top section of gas/vapor cooler vessel 17. The filtered oil is circulated by oil circulating pump 31 through conduit 32 and through oil cooler 33. The oil cooler cools the circulating oil thus removing the heat of condensation and latent heat which the circulating oil gained from the cooling and condensation of the hot gas/vapor passing through the cooler vessel. The cooled circulating oil stream is directed to the gas/vapor cooler vessel 17 through conduit 34. This conduit 34 divides to deliver a majority of the oil flow to an inline hollow cone spray nozzle 35 at the gas/vapor conduit entrance to the vessel and passes through the shell at the top of the gas/vapor cooler where it terminates in a full passage full cone spray nozzle 36 which intimately mixes atomized droplets of cooled recycle oil and gases rising in the gas/vapor cooler vessel 17. The drop size and liquid and gas velocities are chosen to simultaneously further cool the gas stream and transfer high boiling condensate (oil) components to the rising gas stream while transferring condensate (oil) components from the gas to the descending oil stream. This means of heat and mass transfer cost effectively and efficiently provides a more pure gas and oil stream. This is advantageously accomplished without complex mechanical moving parts.

The preferred cooling vessel is a vertical cylindrical ASME §VIII Coded pressure vessel with height approximately 4 times the diameter, conical bottom, domed head, and may preferably include internal baffles. The baffles act to increase the contact between liquid and gas streams while minimizing entrainment of liquid in the gas and gas in the liquid. The inlet and outlet nozzles, internal diameter, and baffles must be sized to allow passage of the fluids. Cooling vessels of this type are available from Ferro-Tech Tire Reclamation, Inc. or may be designed, engineered, and fabricated by others.

Reactor Heating and Gas Recycle

The reactor 1 contains an insulated wall 24 for retaining the heat of the burner 23. The burner may initially be fired with a gas or liquid fuel oil. In continuous operation, the burners are normally fired with the gases recovered from the vaporized constituents generated in the reactor 1. Hence, once initiated, the process can be self-sustaining while producing energy to export from the process to satisfy other fuel requirements. Desirably, the temperature of the drum 4 is above the volatilization temperature of the polymer portion of the carbon black/polymer composite and is dependent on the nature of the polymer with composite. The temperature must be sufficient to crack the polymer, hydrocarbon constituents of the composite yet not be so high as to cause chemical reaction or degradation of the carbon black portion of the composite. Reactions between carbon and oxygen contained in water vapor, carbon monoxide, and carbon dioxide take place rapidly without catalyst at temperatures above 800° C. (1500° F.). Accordingly, the process should be conducted below these temperatures. It should be noted that, for comparison, volatile matter is removed from coal at a temperature of between 925° C. (1700° F.) and 980° C. (1800° F.) in the absence of oxygen which is consistent with the upper limit temperatures suggested above for pyrolysis of the present composites. Accordingly, the temperature of drum 4, at the entrance should be at least 275° C. (525° F.) desirably 360° C. (680° F.), and preferably 385° C. (725° F.). The drum temperature at the exit end, or the maximum temperature reached by the material in the drum 4 should be greater than the entrance temperature and less than 650° C. (1200° F.), desirably less than 600° C. (1110° F.) and most preferably less than 540° C. (1000° F.). It has been found that for typical composites comprising various passenger tire rubber components, an entrance end temperature of 425° C. (800° F.) and exit end temperature of 540° C. (1000° F.) are suitable. The combustion gases from the burners contain usable heat after heating the drum 4. The heat may be recovered in furnace exhaust heat transfer means 25 or discharged to atmosphere without heat recovery. Recovered heat may be used to preheat combustion air for burner 23 as is commonly practiced in preheat exchanges, or the recovered heat is used to satisfy other process thermal requirements.

In one embodiment, a portion of gas from conduit 22 is directed to conduit 26 and to the exit end 13 of cooling drum 11. The exit end 13 is the end the char exits. The gas in conduit 22 is the gaseous fraction obtained from cooler 17 and separator 19. Some or all of the recovered gaseous fraction is recycled by flowing through cooling drum 11 and heating drum 4, as more fully described herein. The volume of recycle gas in conduit 26 is preferably sufficient so that the recycle gas volume in the cooling drum 11 is changed about one time per minute. The recycle gas passes through cooling drum 11 from the end 13 to the end 12 in a flow path counter to the solids flow. This counter flow arrangement provides several advantages: (1) the solids are swept of residual evolving gas or vapor by the low partial pressure of any residue condensate in the recycle gas and the velocity of the gas; (2) the solids are cooled by the recycle gas while the recycle gas is heated by the solids; and (3) high boiling vapor components present with the solids entering the cooling drum are directed toward the recycle gas exit line 27 of drum 11 by counter current flow of recycle gas. Recycle gas is directed from the solids entrance end 12 of the cooling drum 11 through recycle gas exit conduit 27 and then injected into the exit end of heating drum 4 by means of conduit 27 and internal conduit 28.

In the heating drum 4 of reactor 1, the recycle gas follows a flow path from conduit 28 to and through the drum 4 and to and through both conduits 7 and 8. The recycle gas exits drum 4 through conduits 7 and 8. Referring to FIG. 4, as recycle gas passes through heating drum 4 it: (1) sweeps the vaporized constituents away from the exit end 6 of heating drum 4 to prevent condensation of such constituents and to enhance evolution of additional vaporizable constituents from the solid composite material and to facilitate pyrolysis thereof (cracking); (2) reduces the partial pressure of vaporized constituents evolved in drum 4 to facilitate further evolution of such constituents, as a result of the flow momentum of the recycle stream and its composition; (3) provides a higher hydrogen gas concentration in the heating drum 4 relative to the hydrogen present in the evolved gas to promote hydrogenation and at least partial saturation of hydrocarbon compounds formed in drum 4, since the recycle gas has a higher hydrogen gas concentration relative to that of the evolving gas; and (4) reduces the residence time of the evolved vaporizable constituents, particularly time at high temperature, in order to reduce the tendency for such constituents to form polymers and cyclic compounds. The reduced residence time is a direct result of the increased flow rate through the reactor caused by the recycle gas stream, its momentum, the entrainment of evolved constituents in the stream and the fact that the process is run as a continuous process. These four features, in combination, yield a fuel oil product with higher hydrogen content. The benefits of higher hydrogen content in the recovered fuel are better thermal stability, lower density, and more rapid and complete combustion.

It should again be noted that the composite material comprising carbon black and polymer when subject to treatment in drum 4 forms essentially two major product streams. One is the vaporized stream; which exits the drum as a gas/vapor and the other is a solid stream which comprises primarily carbonaceous and also non-carbonaceous material. The stream of vaporized constituents typically contains a relatively volatile component which is vaporizable at relatively low temperatures and/or high pressure. This component readily forms a vapor under moderate conditions of temperature and pressure. Examples are C-4 hydrocarbons, such as butanes, hydrocarbons lighter than C-4, such as methane, ethane and propane, and other gases such as carbon dioxide. A relatively less volatile component volatilizes more slowly (lower rate) or at higher temperatures and/or lower pressures, and is referred to as semi-volatile, condensates, or oil. These are generally c-4 hydrocarbons and higher hydrocarbons. A relatively non-volatile component comprises the solid stream, also referred to as the carbonaceous residue. Such solid comprises carbon black, other solids such as fibers, and often a small amount of very heavy hydrocarbon intermingled with the carbon black. The process of the invention recovers the carbon black having only a very small amount of such heavy hydrocarbon. The hydrocarbon constitutes less than 5 percent by weight of total carbon black and hydrocarbon, desirably it is less than 3 percent by weight and preferably, in the best case, less than 1 percent by weight.

Roll Crushing, Solids Separation, and Milling

The char 14a flowing from air exclusion means 14 of FIG. 2 enters the roll crusher (E, FIG. 1) which is preferably a double roll crusher with dust tight housing and seamless hot finished rolls; type 1045 roll shafts; adjustable spring relief roll; heavy duty ball bearings with grease lubrication and dust seals; roll scraper for each roll; motor; heavy duty speed reducer drive; guarded chain and sprocket drive between rolls and speed reducer; and zero°A inlet and outlet connections, direct drive including flexible coupling, right angle gear reducer and electric motor. The screen is a vibrating scalping screen with a screen body, single perforated plate screening deck with 0.48 cm (3/16") openings, steel coil drive and isolation springs, fiberglass stabilizers, cover, outlets, inlets, horizontally mounted and driven by a 900 RPM, vibratory exciter.

The mill (G, FIG. 1) is preferably a ceramic lined orbital dual chamber jet pulverizer fabricated of carbon steel with feed injector, ceramic or tungsten carbide liners, impact pre-crusher and economatic pressure header. All surfaces contacting the product where high velocity exists are of ceramic or tungsten carbide. The top and bottom mill liners are one piece design silicon carbide ceramic, the venturi with inlet sleeve are self-bonded silicon carbide encapsulated in a flanged stainless steel tube, the outlet extension is of sintered tungsten carbide, the surface of the peripheral wall exposed to the grinding chamber and the removable top head liner is coated with a tungsten carbide hardfacing. All major pressure seals are by "O" ring for positive leak free service. The impact pre-crusher assembly with tungsten carbide target and ceramic lined body is designed to take friable materials and turn them into uniform, flowable powder to feed the jet mill. The assembly is designed to bolt directly to the feed injector. The economatic pressure header has bronze valves, gauges, bypass and controlled return fabricated with stainless steel pipe.

Flow Measurement, Pelletizing, Fluid Bed Drying, and Packaging

The nuclear flow measurement (FIG. 1), is preferably a radiometric non-contacting weigh system complete with gamma rod source isotope Cs-137, lead shielding and mounting frame, scintillation counter detector end-on collimator, single channel microprocessor amplifier with 5 digit display, linearization, auto source decay compensation, minimum/maximum relays, isolated 4–20 mA output, adjustable time constant, membrane keyboard and NEMA 4 enclosure. A tachometer is included to indicate the variable speed of the flow controlled screw feeder.

The pelletizer (I, FIG. 1), is preferably a Ferro-Tech Turbulator with carbon steel housing consisting of four fabricated and machined weldments, endplates and cast-in-place liner. The shaft is a one piece, balanced and machined unit supported by roller bearings. The pins are fabricated of an abrasion resistant alloy. Both the pins and paddles are treated with super wear hardfaced sleeves and threaded into the base. Each end of the shaft as it exits the body, is sealed with a patented rotor labri-seal that is air purged. The main drive consists of a constant speed drive driven by an electric motor through an HDT belt and shaft mount reducer. Material is fed into the Turbulator by a feed screw driven by an electric motor through a shaft mount reducer. The pelleting water system consists of two adjustable pipes mounted on the fixed body of the Turbulator. The liquid additions are controlled by pressure compensating flow control valves. The complete Turbulator and drive are mounted on a welded steel base.

The fluid bed dryer (J, FIG. 1), is preferably a vibrating fluid bed dryer/cooler system complete with rectangular plenum trough, air inlet ports, stainless steel permeation deck with punched openings, 2-zone exhaust hood with air exhaust ports, silicone rubber flexible connections, steel coil isolation springs, fiberglass stabilizers and insulated with fiberglass, driven by an electric vibratory drive. Drying gas is provided by combustion of fuel gas 23 supplied from the cooler (17, FIG. 2) or natural gas, and a supply air fan with actuated outlet damper driven by an electric motor producing drying gases at temperatures up to 260° C. (500° F.). The burner air supply fan is a centrifugal fan with actuated outlet damper driven by an electric motor. Cooling air is provided by a centrifugal fan with actuated outlet damper driven by an electric motor. The gas for drying is a combination of air and combusted fuel gas from the fuel gas exhaust 25 of the recovery process. The preferred temperature is 260° C. (500° F.) which is the maximum time/temperature combination that is inert to the carbon black. Temperatures below about 90° C. (200° F.) are impractical for drying at atmospheric pressure. The volume ratio of air to natural gas is about 120:1 compared to 10:1 stoichiometric.

The invention was successfully demonstrated in a pilot plant according to the Example which follows below. The following ASTM standards (Table I) were used in evaluating products of the Example. These ASTM standards were current as of 1994.

This example demonstrates the method of the invention in accordance with the description given with respect to FIGS. 1 to 5, above. A selected mixture of scrap passenger tires containing conventional carbon blacks of primarily ASTM grades N-300 series and N-660 were reduced to a size approximately 0.6 cm (¼") maximum dimension suitable for a pilot plant scale thermal reactor. The reactor had a 16.5 cm (6½") drum diameter and was 1.8 meters (m) (6 foot (')) in length. At this feed dimension, the composite material was essentially free of wire and fiber. When the rubber size is 0.6 cm (¼"), the teeth of the shredder pull the wire through the rubber because of the small amount of rubber adhering to the wire rather than cutting the wire as is the case with larger pieces of rubber. The composite material was fed through a 5 cm (2") diameter screw conveyor to the drum of the rotary thermal reactor. The level of rubber in the feed bin was kept below the top of the feed bin and above the screw, and a cover over the feed bin prevented air infiltration into the process. The drum rotation and incline propelled the material through the drum at a rate of approximately 3.7 m (12' per hour). This rate was calculated based on the amount of char discharged from the drum after the feed was stopped. The volume of char constituted about 10 percent of the volume of the drum.

The rate of feed input to the continuous process was thereafter maintained at about 3 kilograms (kg) (7 pounds) per hour. Char was recovered from the exit end of the drum at a rate of approximately 1.1 kg (2.4 pounds) per hour. The heating rate for the material in the drum was calculated to be about 14° C. (25° F.) per minute to about 25° C. (45° F.)per minute.

Nitrogen was circulated through the heating drum at a rate of 1.4 cubic meters per hour (50 standard cubic feet per hour) to give velocity similar to recycling recovered product gas. The vaporized constituent evolved in the process was cooled in a water cooled condenser to a temperature of approximately 18° C. (60° F.). The liquid product (condensate) exiting the condenser was collected in sample bottles. The gas was vented to atmosphere. Analysis of the gas showed the results in Table II. The oil (condensate) was collected from the condenser at a rate of approximately 1.3 kg (3 pounds) per hour with the characteristics shown in Table III.

The char from the process was analyzed for CTAB as an indication of the carbon black porosity to rubber. The index was found to be 12 compared with carcass grades in the range of 30 to 45 and tread grades from 90 to over 100. The char was segregated from minor amounts of wire and fiber. It was then milled in a jet mill with a classification to 99 percent less than 4 microns. The throughput in the mill was very high compared to typical mill operation. The resulting carbon black material had an increase in CTAB to an index of 56. Carbon black characteristics are shown in Tables IV–VI. Table VII shows the specification for reclaimed carbon black.

TABLE I

ASTM STANDARDS

| | |
|---|---|
| D412 | Test Methods for Rubber Properties in Tension |
| D1506–90a | Test Method for Carbon Black-Ash Content |
| D1508–89 | Test Method for Carbon Black, Pelleted-Fines Content |
| D1509–88 | Test Method for Carbon Black-Heating Loss |
| D1510–91 | Test Method for Carbon Black-Iodine Adsorption Number |
| D1511–89a | Test Method for Carbon Black-Pellet Size Distribution |
| D1513–89 | Test Method for Carbon Black, Pelleted-Pour Density |
| D1514–90 | Test Method for Carbon Black, Sieve Residue |
| D1619–88 | Test Method for Carbon Black, Total Sulfur |
| D1765–91 | Classification System for Carbon Blacks Used in Rubber Products |
| D1937–89 | Test Method for Carbon Black, Pelleted-Mass Strength |
| D2084–91 | Test Method for Rubber Property-Vulcanization Using Oscillating Disk Cure Meter |
| D2414–91 | Test Method for Carbon Black-n-Dibutyl Phthalate Absorption Number |
| D2663–89 | Test Method for Carbon Black-Dispersion in Rubber |
| D3037–91 | Test Method for Carbon Black-Surface Area by Nitrogen Absorption |
| D3182–89 | Practice for Rubber-Materials, Equipment and Procedures for Mixing Standard Compounds and Preparing Standard Vulcanized Sheets |
| D3191–90 | Test Method for Carbon Black Evaluation in SBR (Styrene-Butadiene Rubber) |
| D3192–89 | Test Method for Carbon Black Evaluation in NR (Natural Rubber) |
| D3265–90 | Test Method for Carbon Black-Tint Strength |
| D3493–91 | Test Method for Carbon Black-n-Dibutyl Phthalate Absorption Number of Compressed Sample |
| D3765–91 | Test Method for Carbon Black-CTAB (Cetyltrimethylammonium Bromide Surface Area) |
| D4324–90a | Test Method for Carbon Black, Pelleted-Pellet Attrition |

TABLE II

| Fuel Gas | Percent |
|---|---|
| Carbon Dioxide | 5–15 |
| Carbon Monoxide | 0.1–5 |
| Hydrogen | 10–20 |
| Methane | 18–30 |
| Ethane | 5–15 |
| Ethylene | 5/15 |
| Propane | 1–6 |
| Propylene | 2–12 |
| C-4's | 8–22 |
| C-5's | 2–12 |
| C-6+ | 0.1–3 |
| Total | 100.0 |

TABLE III

Fuel Oil Properties

| Physical Properties | | Temperature | Boiling Range High | Low |
|---|---|---|---|---|
| Density, lb/gal | 7.2–8.5 | Initial, °C. (°F.) | 73 (163) | 100 (212) |
| Gravity, ° API | 34–7.5 | 25%, °C. (°F.) | 125 (257) | 175 (347) |
| Pour Point, °F. | <5 | 50%, °C. (°F.) | 175 (347) | 225 (437) |
| Lower Hv, Btu/lb | 17,000–19,000 | 70%, °C. (°F.) | 250 (482) | 325 (617) |
| Sulphur, wt % | 0.5–2.5 | 75%, °C. (°F.) | 260 (500) | 350 (662) |
| Ash, % by Btu ignition | 0.005–.03 | | | |
| Viscosity @ 104° F. centistokes | 2–35 | | | |

TABLE IV

Carbon Black Properties

| | Physical/Chemical Properties | | | Particle Size | |
|---|---|---|---|---|---|
| 1. Heating Loss, % | ASTM D1509 | | 0.5–1.5 | 5–15% | < 0.3 micron |
| 2. Ash, % | 16 Hr @ 550° C. | | 8–15 | 10–30% | < 0.4 micron |
| 3. Iodine Adsorption | ASTM D1510 | | 45–60 | 20–60% | < 0.5 micron |
| 4. CTAB, $10^3$ m²/kg | ASTM D3765 | | 45–65 | 50–90% | < 0.8 micron |
| 5. Sulfur, % | ASTM D1619 | | 1.5–3 | 95–99% | < 4.0 micron |

TABLE V

Reclaimed Carbon Black Performance in Rubber According to ASTM D-3191 (BBR)

| 30' Cure data @ 145° C. (300°F.) | N-550 | N-660 | N-774 | N-990 | Reclaimed Black |
|---|---|---|---|---|---|
| 300% Modulus | 2640 | 2150 | 1980 | 500 | 1560 |
| Tensile | 3125 | 3040 | 3100 | 1600 | 2775 |

TABLE VI

TYPICAL CARBON BLACK PROPERTIES

| | Tensile Strength psi | 300% Modulus psi | Calc.[1] Diameter nm | Tint % | DBP cm$^3$/100 g | Iodine mg/g | CTAB 10$^3$ M$^2$/kg | N$_2$ 10$^3$ M$^2$/kg | Density lb/ft$^3$ |
|---|---|---|---|---|---|---|---|---|---|
| N-110 | 3400 | 1770 | 22 | 121 | 113 | 146 | 126 | 143 | 24 |
| N-220 | 3380 | 1880 | 23 | 115 | 114 | 121 | 119 | 119 | 22 |
| N-234 | 3470 | 2120 | 20 | 124 | 125 | 121 | 119 | 126 | 21 |
| N-299 | 3335 | 2195 | 23 | 112 | 124 | 108 | 104 | 108 | 22 |
| N-326 | 3620 | 1620 | 34 | 110 | 72 | 83 | 83 | 84 | 29 |
| N-330 | 3440 | 2400 | 29 | 103 | 102 | 82 | 82 | 83 | 24 |
| N-339 | 3440 | 2740 | 24 | 112 | 120 | 90 | 93 | 96 | 21 |
| N-347 | 3350 | 1920 | 29 | 96 | 124 | 88 | 87 | 90 | 20 |
| N-351 | 3415 | 2560 | 27 | 101 | 120 | 68 | 73 | 73 | 22 |
| N-375 | 3440 | 2685 | 23 | 115 | 114 | 90 | 96 | 100 | 22 |
| N-550 | 3130 | 2530 | 50 | 61 | 121 | 43 | 42 | 42 | 22 |
| N-650 | 3025 | 2340 | 56 | 56 | 122 | 37 | 38 | 38 | 23 |
| N-660 | 3215 | 1820 | 59 | 58 | 90 | 36 | 36 | 35 | 26 |
| N-754 | 2970 | 1500 | 90 | 44 | 58 | 24 | 29 | 29 | 32 |
| N-762 | 2960 | 1530 | 89 | 43 | 64 | 26 | 29 | 28 | 31 |
| N-774 | 3000 | 1580 | 74 | 50 | 72 | 29 | 29 | 29 | 30 |

[1]Particle diameter may be calculated by the formula 3619/Tint + 1820/DBP −24

TABLE VII

Reclaimed Carbon Black Typical Specifications

| | | |
|---|---|---|
| Bulk Density, lb/ft$^3$ | ASTM D1513 | 26–30 |
| Iodine Adsorption, mg/g | ASTM D1510 | 35–50 |
| Heating loss, % | ASTM D1509 | <1.0% |
| Pellet Hardness-Max/Avg, grams | ASTM D1937 | <100/<60 |
| 5 Minute Fines, % | ASTM D1508 | <8% |
| pH | — | 7.5 +/−0.5 |
| Tensile, psi | ASTM D3191 | >2500 |

TABLE VIII

CONDITION OF STREAMS

| Stream N° | Description | Temp. °C. | (°F.) | Pressure |
|---|---|---|---|---|
| 2 | Polymer Feed | 25 | (77) | +/−2" W.C. |
| 1 | Thermal Processing | 480 | (896) | +/−2" W.C. |
| 7&8 | Gas/Vapor | 480 | (896) | — |
| 9 | Hot Char/Solids | 480 | (896) | — |
| 14 | Cool Char/Solids | 65 | (150) | 20 Psig |
| 15 | Water Spray Cooling | 25 | (77) | Ambient |
| 16 | Hot Water Discharge | 50 | (122) | −6" W.C. |
| 20 | Recycle Gas | 38 | (100) | 5 Psig |
| 22 | Recycle Gas | 38 | (100) | 5 Psig |
| 23 | Total Fuel Gas | 38 | (100) | 5 Psig |
| 25 | RTP Flue Gas | 815 | (1,500) | −1" W.C. |
| 26 | Recycle Gas | 38 | (100) | 5" W.C. |
| 27 | Heated Recycle Gas | 315 | (600) | 5 Psig |
| 29 | Quench Oil | 50 | (122) | 5 Psig |
| 32 | Quench Oil | 50 | (122) | 50 Psig |
| 34 | Quench Oil | 38 | (100) | 35 Psig |
| 35 | Quench Oil | 38 | (100) | 20 Psig |
| 36 | Quench Oil | 38 | (100) | 20 Psig |

TABLE IX

YIELD FROM TIRE PROCESSING

| Tire Processing Yields | Percent |
|---|---|
| Fuel Gas, % by wt. | 10–20 |
| Fuel Oil, % by wt. | 35–50 |
| Carbon Black, % by wt. | 25–45 |
| Steel and Fiber, % by wt. | 5–15 |
| Total | 100 |

The carbon black was pelletized using ¼ percent to 8 percent by weight of a 50% by weight solution of lignosulfonate relative to the weight of carbon black. It was classified to retain pellets having a size of about 10×80 mesh (1,680 and 177 microns). The pellet strength was determined according to ASTM D-1937 and attrition according to ASTM D-1508. The pellets were found to have strength and fines comparable to typical rubber industry standards with similar binder levels.

Rubber compounds were produced following ASTM D-3191 formulation and analyzed for their rubber performance. The results, shown in Table V are tensile, elongation, and modulus properties in the range of rubber properties generally achievable with carbon black in the ASTM D-1765 range of N-550 to N-774. Thus it was demonstrated that rubber products may be produced with carbon blacks recovered by the method of this invention as they conform to commercial grade standards.

The condition of the material in various process apparatus and in various streams shown in FIG. 2 are given in Table VIII. Table IX shows the typical yield from the reclamation process according to the invention. In commercial operation, for every 5000 pounds of scrap as described in the example, the process produces 1650 to 2200 pounds of carbon black, 2000 to 2400 pounds of oil, 500 to 100 pounds of gas, plus 200 to 600 pounds of steel and fiber.

The carbon black produced by the process of the invention is a reclaimed carbon black with chemical and physical properties similar to conventional carbon blacks. Its performance in rubber is consistent with performance of conventional, commercially usable carbon blacks. This is achieved without the necessity of operating under a vacuum or at very high pressures. In addition, the method of the invention provides useful, gaseous, and liquid product streams which are recycled to provide energy for the process and for injection into the process to control the atmosphere under which decomposition takes place so as to generate commercially usable carbon black as well as useful gaseous and liquid products. Advantageously, the process of the invention is a continuous process rather than a batch process.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

I claim:

1. A method for continuously recovering carbon black from a plurality of solid composites, each one of the composites comprising the carbon black and polymers, said method comprising the steps of:

a. providing a reactor comprising a chamber having a first end and a second end spaced apart from said first end along a generally horizontally oriented longitudinal axis of said chamber extending between said ends, means for transporting composite solids material along a travel path running from said first to said second end, and first and second conduit means for removing vaporized constituents of the composite solids separately from the first and second zones of said chamber and being located above the solids travel path and respectively adjacent said first and second ends;

b. preparing a mixture of the composites;

c. fragmentizing the composites mixture to form pieces of the composites;

d. introducing the fragmentized mixture pieces to said reactor while minimizing air infiltration into the reactor;

e. heating the fragmentized mixture in said reactor by conveying said fragmentized mixture in a continuous solids stream through said chamber along the chamber travel path and sequentially heating said mixture stream to a first temperature sufficient in the first chamber zone to crack the solid polymers and thereby volatize a relatively more volatile first portion of volatizable constituents of the mixture and then further heating the mixture in the second chamber zone to a second temperature greater than the first temperature, said second temperature being sufficient to vaporize at least most of any remaining vaporizable constituents formed as a second portion of volatizable constituents from said cracked solids polymer, said temperatures being less than the oxidation temperature of said carbon black thereby providing a solid residue as the mixture reaches the downstream end of the chamber travel path;

f. continuously removing said vaporized constituents from said chamber by flowing from said first zone the first portion of said vaporized constituents in a direction toward the first end of the chamber and through a first outlet associated with the first zone of the chamber and communicating with said first conduit means, and flowing from said second zone the second portion of said vaporized constituents in a direction toward the second end of the chamber and through a second outlet associated with the second zone of the chamber and communicating with said second conduit means;

g. cooling the vaporized constituents and separating a condensate fraction of said vaporized constituents from a gaseous fraction of said vaporized constituents;

h. continuously conveying non-vaporizable residue from the second zone of the chamber;

i. continuously separating carbonaceous material from said residue;

j. continuously comminuting said carbonaceous material to form particles of carbon black having a size less than about 5 microns and then;

k. combining said communicated carbon particles with a binder dispersed with a liquid and forming pellets of said particles; and l. drying said pellets to remove at least a portion said liquid, by flowing a heated gas stream upward and through the pellets wherein the heated gas is a mixture of the combustion products of said gaseous fraction and air for combustion supplied at a temperature in a range of about 90° C. to about 300° C.

2. The method according to claim 1 and further including heating said reactor with a portion of said gaseous fraction.

3. The method according to claim 1 and further including injecting a portion of said gaseous fraction into the second zone of the reactor chamber adjacent the second end of said chamber.

4. The method according to claim 1 wherein the step of cooling the vaporized constituents is at a temperature which provides said condensate fraction comprising constituents having a boiling point in a range of about 20° C. to about 75° C.

5. The method according to claim 1 wherein the step of cooling the vaporized constituents is conducted by contacting said vaporized constituents with a recycled portion of the condensate fraction at a temperature in a range of about 20° C. to about 75° C.

6. The method according to claim 5 wherein the temperature of the recycled condensate is varied to change the proportion of the gas fraction relative to the condensate fraction.

7. The method according to claim 5 wherein the condensate fraction is passed through a duplex dual basket strainer with 10 micron openings to remove particulate matter.

8. The method according to claim 5 wherein the contacting of said vaporized constituent is done by spraying atomized condensate fraction into a stream of said vaporized constituents while it is still in the conduit and then passing the vaporized constituents through one or more curtains of falling condensate fraction as it passes up through the vessel.

9. The method according to claim 8 wherein the temperature of the condensate is controlled by passing it through an air or water to oil heat exchanger.

10. The method according to claim 1 wherein the heated gas stream is passed upward and through the pellets in a vibrating fluidized bed dryer to dry the pellets.

11. The method according to claim 1 and further including after step (1) cooling the dried pellets by flowing an ambient temperature air stream upward and through the pellets and separating particles finer than 150 microns (100 mesh) from the pellets by entraining said fine particles in the flowing air stream.

12. The method according to claim 11 wherein the ambient temperature air stream is passed through the pellets in a vibrating bed fluidized bed cooler to cool the pellets.

13. The method according to claim 1 and further including injecting a flowing gas stream into the chamber second zone adjacent the second end of said chamber, said stream having a hydrogen gas content, based on volume percent, which is greater than the volume percent of hydrogen gas in said vaporized constituents; whereby said vaporized constituents of said cracked polymers are combined with said hydrogen to cause at least partial saturation of at least a portion of said vaporized constituents of said cracked polymers and said vaporized constituents are entrained in the flowing gas stream and moved out of the reactor by movement of said flowing gas stream.

14. The method according to claim 13 wherein said flowing gas stream is injected at a rate, based on volume per unit of time, which is in a range of 0.67 to 2.5 times the rate at which said vaporized constituents are produced in said chamber.

15. The method according to claim 1 and further including after step (e), cooling the residue to a third temperature which is less than the first temperature.

16. The method according to claim 15 wherein the step of cooling the residue occurs before step (i) of claim 1, in an environment which is inert with respect to carbon black.

17. The method according to claim 16 and further including cooling said residue by contacting said residue with a gaseous fraction of said vaporized constituent obtained by cooling said vaporized constituents and separating a condensate fraction of said vaporized constituent from said gaseous fraction of said vaporized constituent.

18. The method according to claim 17 wherein the residue is cooled by flowing the gaseous fraction over a moving bed of the residue in a counterflow arrangement, whereby the gaseous fraction is heated.

19. The method according to claim 18 and further including injecting said heated gaseous fraction into the second zone of said reactor chamber adjacent the second end of said reactor chamber.

20. The method according to claim 15 wherein the third temperature is in a range of about 65° C. to about 150° C.

21. The method according to claim 16 wherein the residue is discharged into a second chamber where the exterior of the second chamber is cooled with a water bath to reduce the temperature of the residue to less than 150° C.

22. The method according to claim 1 wherein in step (e) the first temperature is in a range of about 275° C. to about 385° C., the second temperature is in a range of about 400° C. to about 650° C.

23. The method according to claim 11 wherein step (e) of heating is conducted in the presence of oxygen (O2,) while step (d) is performed for controlling the volumetric fraction of oxygen (O2,) in said chamber to a maximum value no greater than about 1.5 times the amount of a minimum value that is at least about one half of one percent by volume of the total volume of said vaporized constituents.

24. The method according to claim 1 whereby in step (j) the binder is selected from the group consisting of lignosulfonate, molasses, waste from sugar manufacture, waste from beer manufacturing, or other sugar containing products.

25. The method according to claim 24 wherein the quantity of binder is between 0.25 and 8 pounds for each 100 pounds of carbon black.

26. The method according to claim 1 wherein the liquid of step (k) is water and the binder is soluble in water.

27. The method according to claim 26 wherein a water solution containing said binder has one part by weight water for each one part binder.

28. The method according to claim 1 wherein in step (h) the carbonaceous material and non-carbonaceous material are reduced in size by passing both the materials through a double roll crusher to achieve a particle size with the smallest dimension less than 0.25 cm to 0.5 cm (0.1 to 0.2").

29. The method according to claim 28 wherein the size reduced material is processed in a drum magnetic separator wherein any steel is removed.

30. The method according to claim 29 wherein said carbonaceous and said non-carbonaceous material, from which the steel has been removed are placed on a vibrating platform which comprises a solid plate for the first one-quarter of the platform and a wire mesh deck for the remainder of the platform and said size reduced carbonaceous material is removed by gravity by falling through said wire mesh deck and said non-carbonaceous material is passed over the wire mesh deck.

31. The method according to claim 1 wherein step (l) is conducted by flowing a heated gas stream upward and through the pellets and by separating any particles finer than 150 microns from the pellets by entraining said fine particles in the flowing gas stream.

32. The method according to claim 11 wherein step (c) is conducted by fragmentizing the composites to pieces having their maximum size less than about one half of a foot (about 0.2 meter).

33. The method according to claim 11 wherein step (c) is conducted by fragmentizing the composites to pieces having their maximum size less than a passenger tire which has been cut into two pieces by cutting circumferentially at the center of the tread and again cutting each resulting piece further into 10 equal size pieces.

34. The method according to claim 1 step (d) consists of three flap valves forming two sequential mixture feed upstream and downstream chambers with each valve operating in sequence, to control oxygen infiltration into the reactor, and control emission of vaporized constituents from the reactor, and wherein the two chambers are alternately filled with gas and pressurized air, the gas being recycled from the vaporized constituents obtained in step (f), and then recycle gas is purged from the associated chamber with a flow of the pressurized air when all flap valves are closed, the downstream chamber being full of recycle gas when opening the exit flap valve therefrom to admit the mixture contents thereof to the first zone of the reactor chamber.

35. The method according to claim 1 wherein in step (j) the carbon is reduced in size by jet milling utilizing compressed air as the grinding fluid.

36. The method according to claim 1 wherein step (b) is performed as a classification of carbon blacks in a series of mixtures of the composites by preparing a series of mixtures of the composites with each one of the series having a distribution of at least one carbon black property which is substantially similar to the distribution of said property in the others of the series; said property being selected from among surface area, particle size, tint, and structure.

37. The method according to claim 36 wherein step (b) is conducted by determining the surface area of carbon particles by measuring the capillary action in each of the composites, and combining the composites in the mixture so that the average carbon particle surface area of the compos ites in the mixture varies by no more than 10 percent compared to the carbon particle average surface area of any other of the composites in the mixture, where surface area is defined as CTAB absorption of the milled char according to the ASTM D3765 method.

38. The method according to claim 36 wherein step (b) is conducted by determining the particle size of carbon particles in each of the composites, and combining the composites in the mixture so that the average carbon particle size in the mixture varies by no more than 10 percent compared to the average carbon particle size of any other of the composites in the mixture, where particle size is defined as primary aggregate dimension according to the procedure of ASTM D3849.

* * * * *